(12) United States Patent
Takahashi

(10) Patent No.: US 6,807,051 B2
(45) Date of Patent: Oct. 19, 2004

(54) DISPLAY APPARATUS

(75) Inventor: Hitoshi Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 25 days.

(21) Appl. No.: 10/310,610

(22) Filed: Dec. 5, 2002

(65) Prior Publication Data

US 2003/0128503 A1 Jul. 10, 2003

(30) Foreign Application Priority Data

Dec. 7, 2001 (JP) ...................................... P2001-373905

(51) Int. Cl.[7] .............................. G06F 1/16; H04R 1/02
(52) U.S. Cl. ........................ 361/681; 361/682; 381/306; 381/333
(58) Field of Search ................................ 361/679–683, 361/724–727; 248/917; 345/169, 905; 312/223.1, 223.2

(56) References Cited

U.S. PATENT DOCUMENTS

| | | | |
|---|---|---|---|
| 4,646,349 A | | 2/1987 | Puls .............................. 381/24 |
| 5,400,408 A | * | 3/1995 | Lundgren et al. ............ 381/306 |
| 5,568,357 A | * | 10/1996 | Kochis et al. ............... 361/681 |
| 5,689,574 A | * | 11/1997 | Heirich et al. ............... 381/354 |
| 5,761,322 A | * | 6/1998 | Illingworth et al. ......... 381/386 |
| 5,796,854 A | * | 8/1998 | Markow ....................... 381/385 |
| 5,818,942 A | * | 10/1998 | Freadman ..................... 381/300 |
| 5,970,161 A | * | 10/1999 | Takashima et al. .......... 381/386 |
| 6,130,658 A | * | 10/2000 | Yamamoto et al. .......... 345/102 |
| 6,411,720 B1 | * | 6/2002 | Pritchard ..................... 381/348 |

FOREIGN PATENT DOCUMENTS

| | | | |
|---|---|---|---|
| EP | 0462571 | 12/1991 | ............ H04N/5/64 |
| EP | 0598391 | 5/1994 | ............ H04N/5/64 |
| JP | 09284674 | 10/1997 | ............ H04N/5/64 |
| JP | 10126713 | 5/1998 | ............ H04N/5/56 |
| JP | 2000287287 | 10/2000 | ............ H04R/1/02 |
| WO | WO0178445 | 10/2001 | ............ H04R/3/00 |

* cited by examiner

Primary Examiner—Darren Schuberg
Assistant Examiner—Anthony Q. Edwards
(74) Attorney, Agent, or Firm—Jay H. Maioli

(57) ABSTRACT

A display apparatus with a speaker unit that is generally small in a depthwise dimension but that can generate sound of a good quality in the form of a television receiver includes a plasma display panel, a front panel having an opening through which a display face of the plasma display panel is exposed, and a back cover attached to the front panel for covering the back of the plasma display panel, with the speaker units disposed between the front panel and the back cover. The television receiver further includes a partition wall plate for covering the back of the display panel such that a space is formed between the partition wall plate and the back cover, and each of the speaker units is disposed in the space.

6 Claims, 10 Drawing Sheets

DISPLAY APPARATUS

BACKGROUND OF THE INVENTION

This invention relates to a display apparatus in which a speaker unit is incorporated, and more particularly to a technique for preventing deterioration of the sound quality caused by reduced thickness configuration of an entire display apparatus.

From among various display apparatus, those display apparatus which have a small depthwise dimension, that is, a small thickness, with respect to the size of the display screen have been and are being placed on the market in recent years such as, for example, a plasma display apparatus (PDP: plasma display panel), an electroluminescent display apparatus (ELD) and a liquid crystal display apparatus (LCD).

Some of display apparatus of the type described include a speaker unit like a television receiver.

Incidentally, it is known that a good sound quality can be obtained if a speaker unit is attached to a speaker cabinet. However, if it is tried to dispose a speaker unit on a display apparatus, then an article having a comparatively great depthwise dimension such as a speaker cabinet is disposed on the display apparatus. Consequently, there is a problem that the speaker unit increases the depthwise dimension although the display portion of the display apparatus has a reduced depthwise dimension.

Therefore, conventionally it is a common countermeasure to provide a speaker unit on a speaker cabinet separate from a thin display unit to form a speaker system separate from the thin display unit and externally connect the speaker system to the thin display unit or attach only a speaker unit to a front panel of a thin display unit.

However, the former countermeasure has a problem in that, since the speaker unit and the display section are separate from each other, it is cumbersome to handle the speaker unit.

Meanwhile, the latter countermeasure has another problem in that, although the entire apparatus can be formed with a small thickness, since no speaker cabinet is involved, a good sound quality cannot be obtained.

Particularly if the area of a back cover of the display unit or the like increases as the screen size increases, then when the speaker unit is driven, small vibrations called chattering are sometimes generated on the back cover.

SUMMARY OF THE INVENTION

It is an object of the present invention to provide a display apparatus which is small in depthwise dimension but can generate sound of a good quality.

In order to attain the object described above, according to the present invention, there is provided a display apparatus including a display panel, a front panel having an opening through which a display face of the display panel is exposed, a back cover attached to the front panel for covering the back of the display panel, at least one speaker unit disposed between the front panel and the back cover, and a partition wall plate for covering the back of the display panel such that a space is formed between the partition wall plate and the back cover, the at least one speaker unit being disposed in the space.

In the display apparatus, the space formed between the partition wall plate and the back cover functions as a space of a speaker cabinet. Therefore, although the apparatus generally has a small depthwise dimension, deterioration of the sound quality can be prevented.

Preferably, the partition wall plate is formed from an electromagnetic shielding material. Since the partition wall plate is formed from an electromagnetic shielding material, electromagnetic waves radiated to the back face side of the display panel can be shielded effectively. Further, since the electromagnetic shielding material is disposed on the inner side of the back cover, there is no necessity to form the back cover itself from a shielding material, and therefore, the degree of freedom in selection of the material for the back cover can be maintained.

Preferably, a plurality of the speaker units are provided, a partition member for dividing the space between the partition wall plate and the back cover into left and right divisional spaces is provided, and the speaker units are disposed individually in the left and right divisional spaces. Where the speaker units are disposed individually in the divisional spaces, sounds outputted individually from the speaker units do not mix with each other. Consequently, the speaker units can be located leftwardly and rightwardly independently of each other, and further improvement of the sound quality can be anticipated.

Preferably, the back cover and the partition wall plate contact with each other at a plurality of locations in addition to outer peripheral edge portions thereof. Where the back cover and the partition wall plate contact with each other at a plurality of locations in this manner, even where the partition wall plate and the back cover have a comparatively large area, vibrations of them can be prevented.

Preferably, a plurality of cross-shaped ribs having a cross-shape as viewed from the front are formed on the inner face of the back cover and contact at ends thereof with the partition wall plate. Where the cross-shaped ribs are used in this manner, they can prevent small vibrations of the partition wall plate and the back plate with certainty while the means for preventing such small vibrations can be formed in a simple configuration by the cross-shaped ribs.

Preferably, a cushioning material is interposed between the cross-shaped ribs and the partition wall plate. Where the cushioning material is used in this manner, the contact between the partition wall plate and the back cover can be established with certainty even if the accuracy in dimension and the accuracy in mounting of them are comparatively rough. Consequently, small vibrations can be prevented with a higher degree of certainty.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

In the following, display apparatus according to different embodiments of the present invention are described successively with reference to the accompanying drawings. It is to be noted that, in the embodiments described below, the display apparatus of the present invention is applied to a plasma display apparatus.

FIGS. 1 to 7 show a display apparatus, according to a first embodiment of the present invention, which is applied to a television receiver which employs a plasma display panel.

Figure 1:
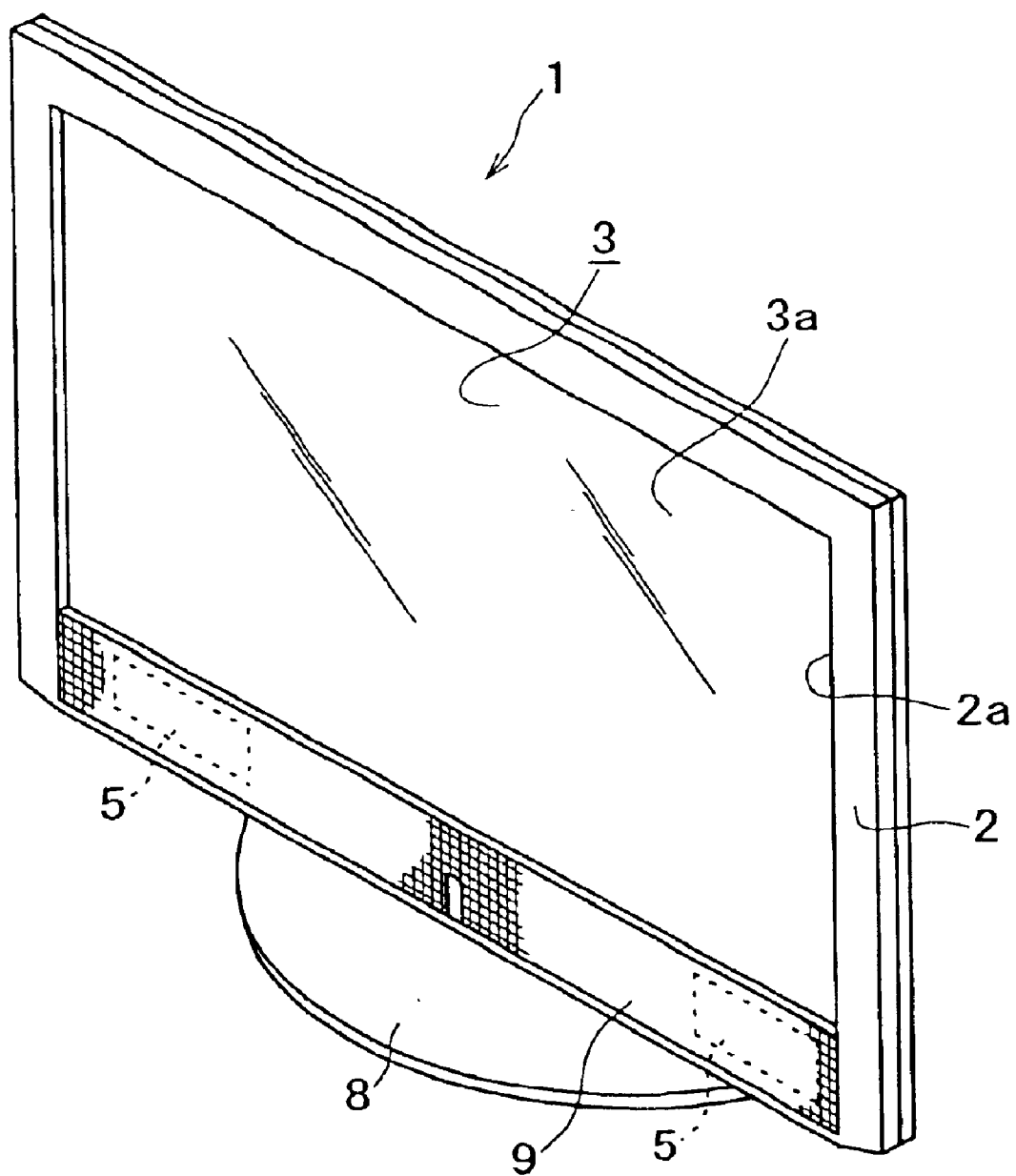
FIG. 1 is a perspective view of a display apparatus according to a first embodiment of the present invention as viewed from the front side.
Figure 2:
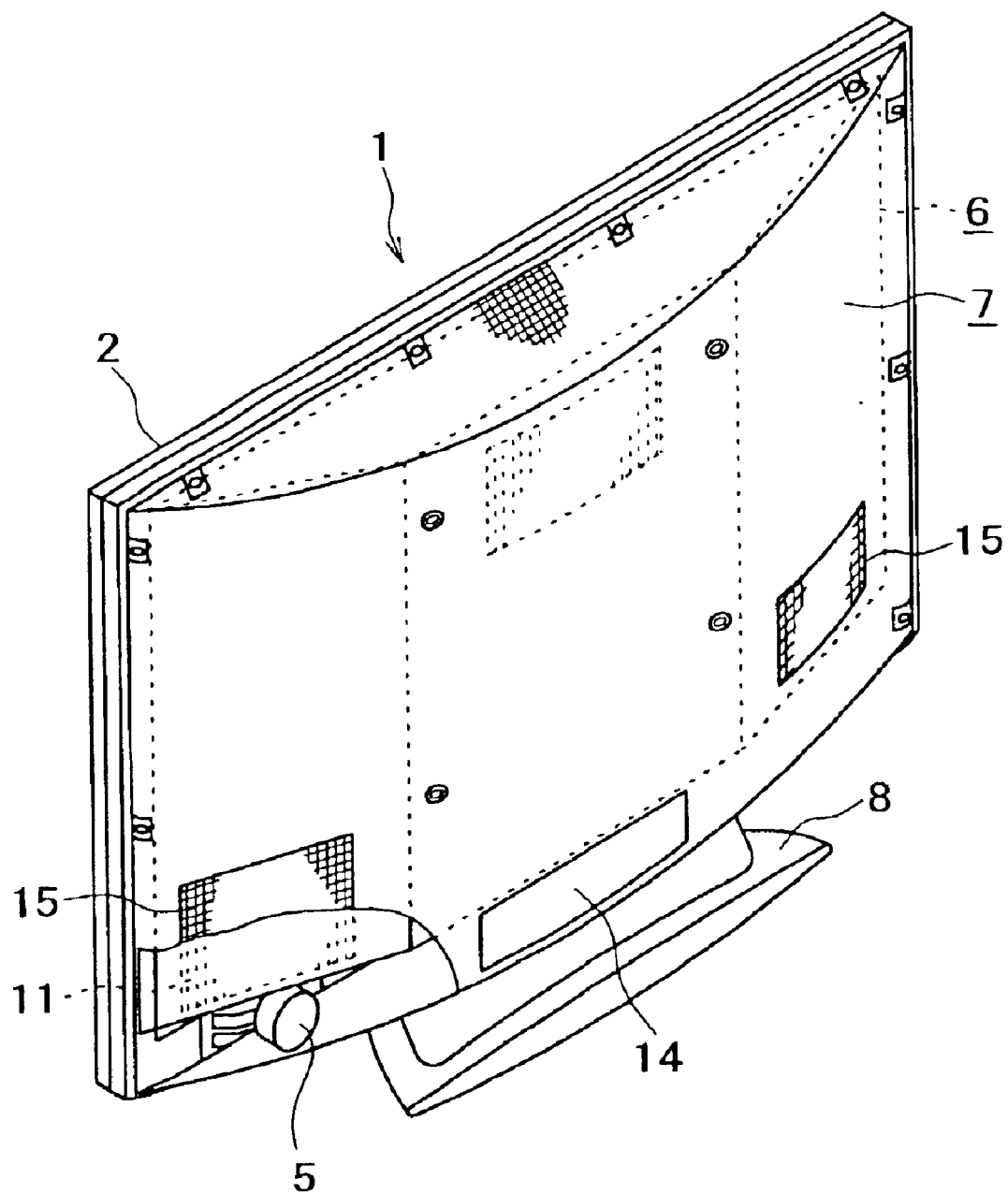
FIG. 2 is a perspective view partly cut away of the display apparatus according to the first embodiment as viewed from the back side.
Figure 3:
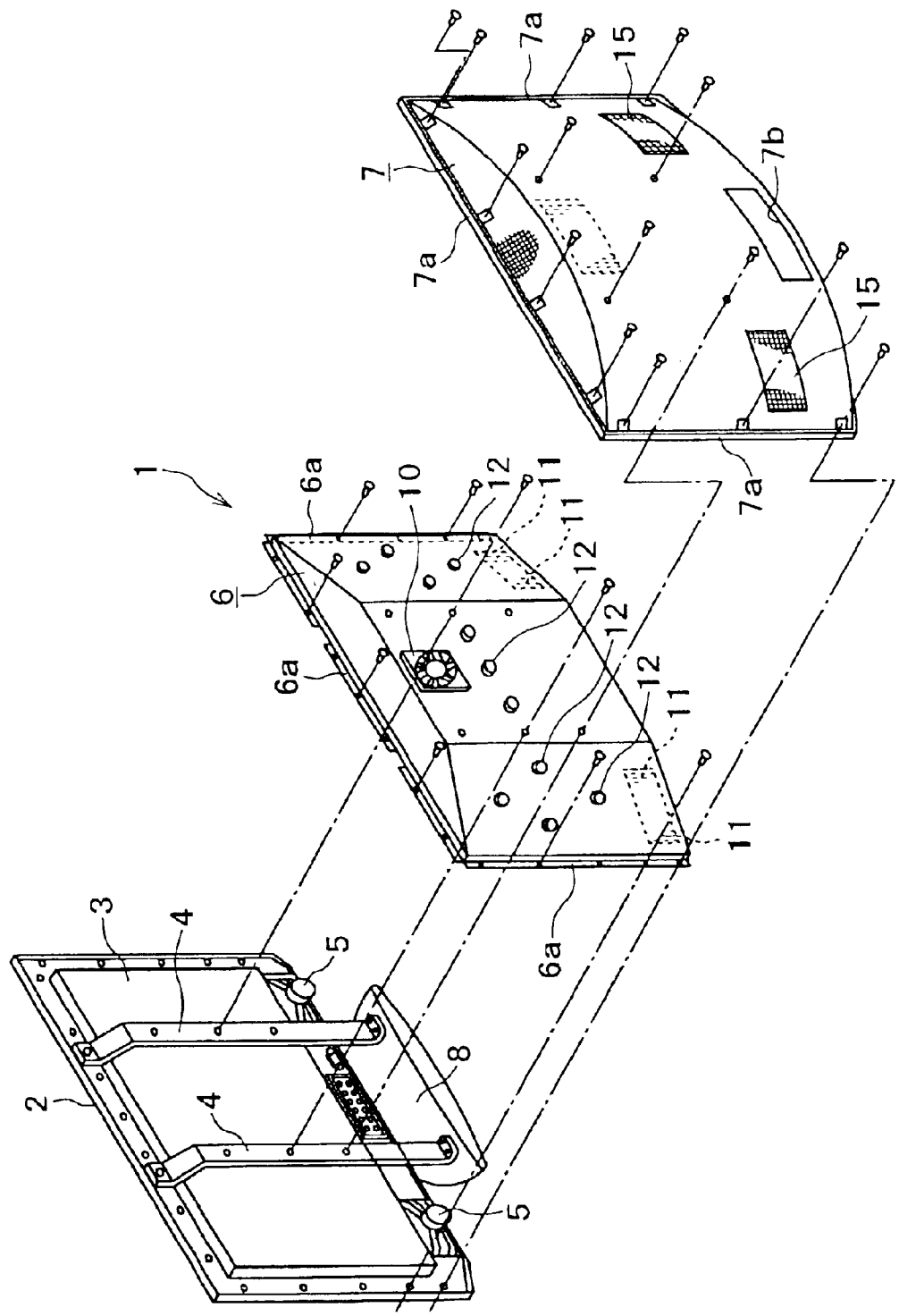
FIG. 3 is an exploded perspective view of the display apparatus according to the first embodiment as viewed from the back side.

Referring to FIGS. 1 to 7, the television receiver 1 shown includes a front panel 2 in the form of a frame, a plasma display panel 3 attached to the front panel 2 in such a manner that it is fitted in a front opening 2a of the front panel 2, a printed circuit board (not shown) mounted on the back face of the plasma display panel 3 and having an electric circuit formed thereon for driving the plasma display panel 3, a pair of support chassis 4 extending upwardly and downwardly in a bridge-like manner between the printed circuit board and the back face of the plasma display panel 3, a pair of speaker units 5 disposed at the opposite left and right end portions of a lower portion of the front panel 2, a partition wall plate 6 for covering the plasma display panel 3 and the printed circuit board from the back side, a back cover 7 for covering the partition wall plate 6 and the speaker units 5 from the back side, and a stand 8 for supporting the components of the television receiver 1 (refer to FIG. 2).

A large number of speaker small holes (not shown) are formed at positions of the front panel 2 in the proximity of the opposite left and right end portions below the front opening 2a in a corresponding relationship to the speaker units 5, and the speaker units 5 are disposed at the locations such that they are directed forwardly. It is to be noted that, in the television receiver 1 shown, a net 9 extends in front of the speaker holes (refer to FIG. 1). Further, while the television receiver 1 in the present embodiment includes two speaker units 5, according to the present invention, the number of speaker units is not limited to two.

Where the two speaker units 5 are disposed on the lower side of the opposite left and right end portions of the television receiver 1 in this manner, the television receiver 1 can be designed such that the thickness (depthwise dimension) thereof decreases from a central portion of the television receiver 1 in the leftward and rightward direction towards the opposite left and right side portions as hereinafter described in detail. This is effective to design the television receiver 1 so as to emphasize that the television receiver 1 has a small depthwise dimension. Naturally, according to the present invention, the disposed positions of the speaker units are not limited to the specific positions, but the speaker units may otherwise be disposed at the opposite left and right side portions of the television receiver 1.

The plasma display panel 3 is attached at outer peripheral edges thereof to outer peripheral edges of the back face of the front panel 2 by means of screws or the like such that a display face 3a of the plasma display panel 3 is exposed through the front opening 2a of the front panel 2 (refer to FIG. 1).

The printed circuit board attached to the back face of the plasma display panel 3 includes not only a drive circuit for the plasma display panel 3 but also various circuits necessitated by the television receiver 1.

The support chassis 4 are secured by means of screws to and extend between the upper and lower sides of the front panel 2. The lower ends of the support chassis 4 extend downwardly farther than the lower sides of the front panel 2 and are coupled to the stand 8 of the television receiver 1 so that the support chassis 4 function as legs of the television receiver 1 (refer to FIGS. 3 and 6). Since the front panel 2, partition wall plate 6 and back cover 7 are screwed directly to the support chassis 4 as hereinafter described, the uprightly erected state of the television receiver 1 can be stabilized structurally.

The partition wall plate 6 is formed from a metal material such as, for example, aluminum so that electromagnetic waves radiated from the plasma display panel 3 to the back face side may be shielded.

The partition wall plate 6 is formed such that it is swollen rearwardly toward the center thereof so that it may not interfere with various electronic parts mounted on the printed circuit board in the internal space of the swollen portion (refer to FIG. 2). It is to be noted that the partition wall plate 6 of the television receiver 1 in the present embodiment is formed in such a shape that it is composed of a combination of flat plates as particularly seen in FIG. 3 so that the cost of the partition wall plate 6 upon manufacture can be reduced. In particular, although it is a possible idea to curve the partition wall plate 6 such that it is swollen rearwardly, the curved formation requires a higher cost in manufacture. However, if the partition wall plate 6 is curved such that it is swollen rearwardly toward its center in this manner, "small vibrations of the partition wall plate 6" can be prevented effectively.

Figure 4:
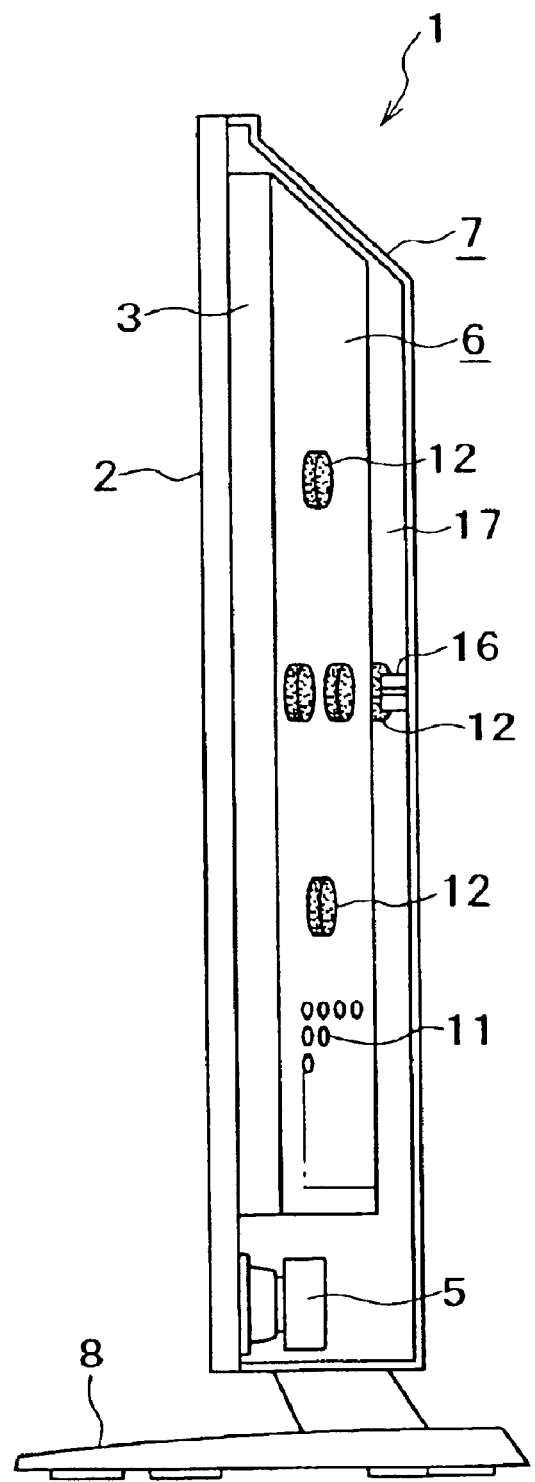
FIG. 4 is a vertical sectional view according to the display apparatus according to the first embodiment.

The partition wall plate 6 has a dimension in the vertical direction smaller than that of the front panel 2, and the speaker units 5 are not positioned in the inside of the partition wall plate 6 (refer to FIG. 4). It is to be noted that, in FIG. 4, in order to facilitate illustration, only that one of cross-shaped ribs 16 of the back cover 7 which is positioned centrally is shown while the other cross-shaped ribs 16 (refer to FIG. 7) are omitted, and also a fan 10 (refer to FIG. 6) is omitted.

Figure 6:
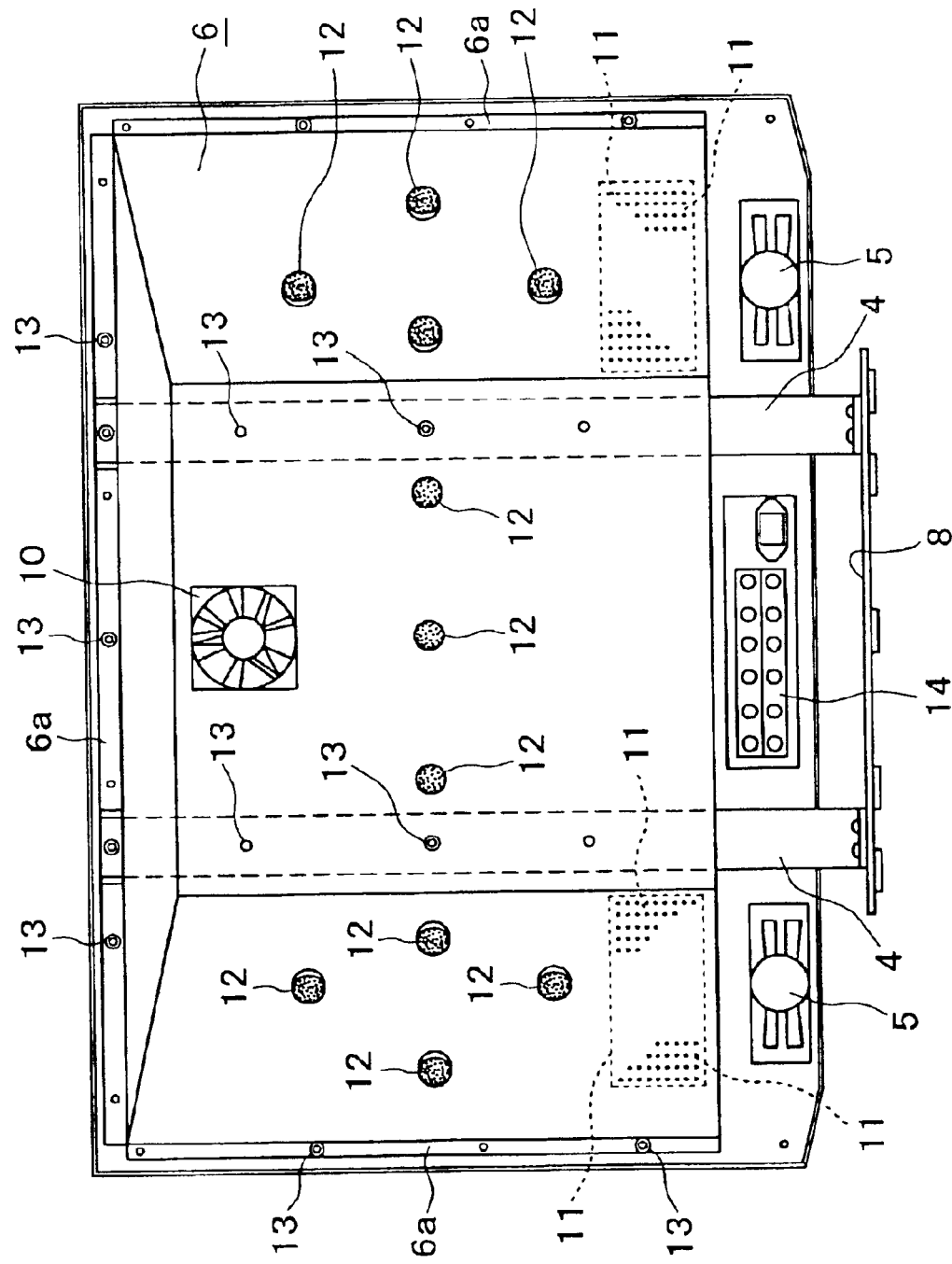
FIG. 6 is a rear elevational view of the display apparatus according to the first embodiment with a back cover removed.

The fan 10 for heat radiation is disposed at a position rather upwardly of the center of the partition wall plate 6, and a large number of heat radiation holes 11 are formed on the lower side of the opposite left and right end portions of the partition wall plate 6 (refer to FIG. 6).

The partition wall plate 6 has flange portions 6a provided on the upper side and the opposite left and right sides thereof, and is screwed at the flange portions 6a thereof to the upper side and the opposite left and right sides of the front panel 2 and also to the support chassis 4.

A plurality of sponge-like cushioning members 12 having a flattened cylindrical shape are adhered to predetermined locations of the back face of the partition wall plate 6 (refer to FIG. 6).

Each of the predetermined locations is a point between two arbitrary ones of a plurality of screwed portions 13 at which the partition wall plate 6 is screwed to the support chassis 4 and the front panel 2 (refer to FIG. 6). The screwed portions 13 include those screwed portions 13 at each of which, when the back cover 7 is attached, the back cover 7 is fastened together by the common screw. Consequently, deflection at those portions (intermediate portions) of the partition wall plate 6 and the back cover 7 at which they are most likely to be deformed between the screwed portions 13 can be prevented effectively.

The back cover 7 is formed from a molded article and has a size sufficient to fully cover the back face of the front panel 2 such that the back cover 7 covers the partition wall plate 6 and the two speaker units 5 (refer to FIG. 2).

Figure 7:
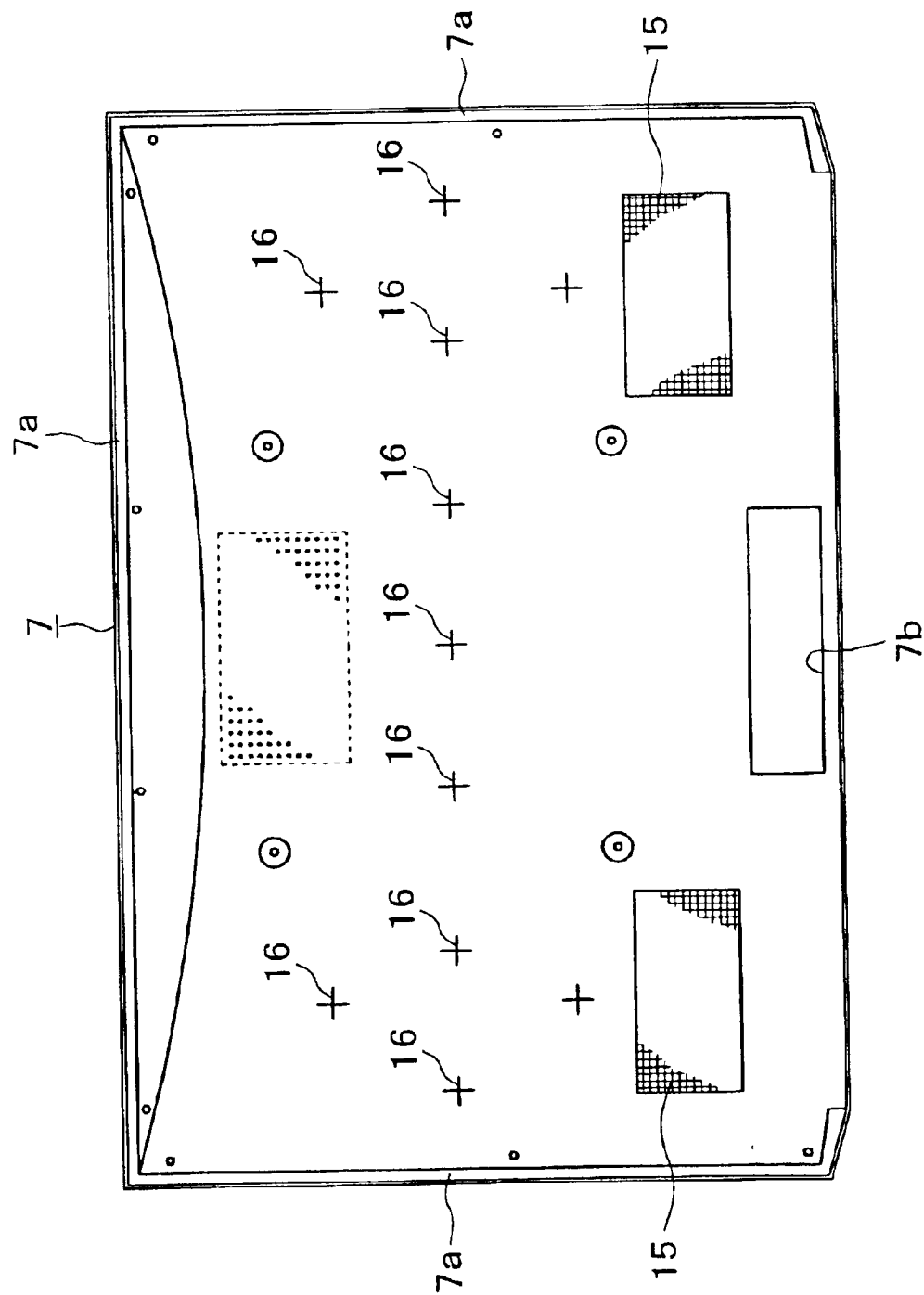
FIG. 7 is a front elevational view of the back cover of the display apparatus according to the first embodiment.

It is to be noted that an input and output terminal panel 14 for establishing a connection to the outside is disposed between the two speaker units 5 disposed leftwardly and rightwardly (refer to FIG. 6) An opening 7b is formed at a suitable portion of the back cover 7 so that the input and output terminal panel 14 may be exposed rearwardly (refer to FIG. 7). Further, a large number of heat radiation holes (not shown) are formed at positions of the lower side of the opposite left and right portions of the back cover 7 corresponding to the heat radiation holes 11 of the partition wall plate 6, and a pair of nets 15 are adhered to the locations at which the heat radiation holes are formed (refer to FIGS. 2 and 7).

Figure 5:
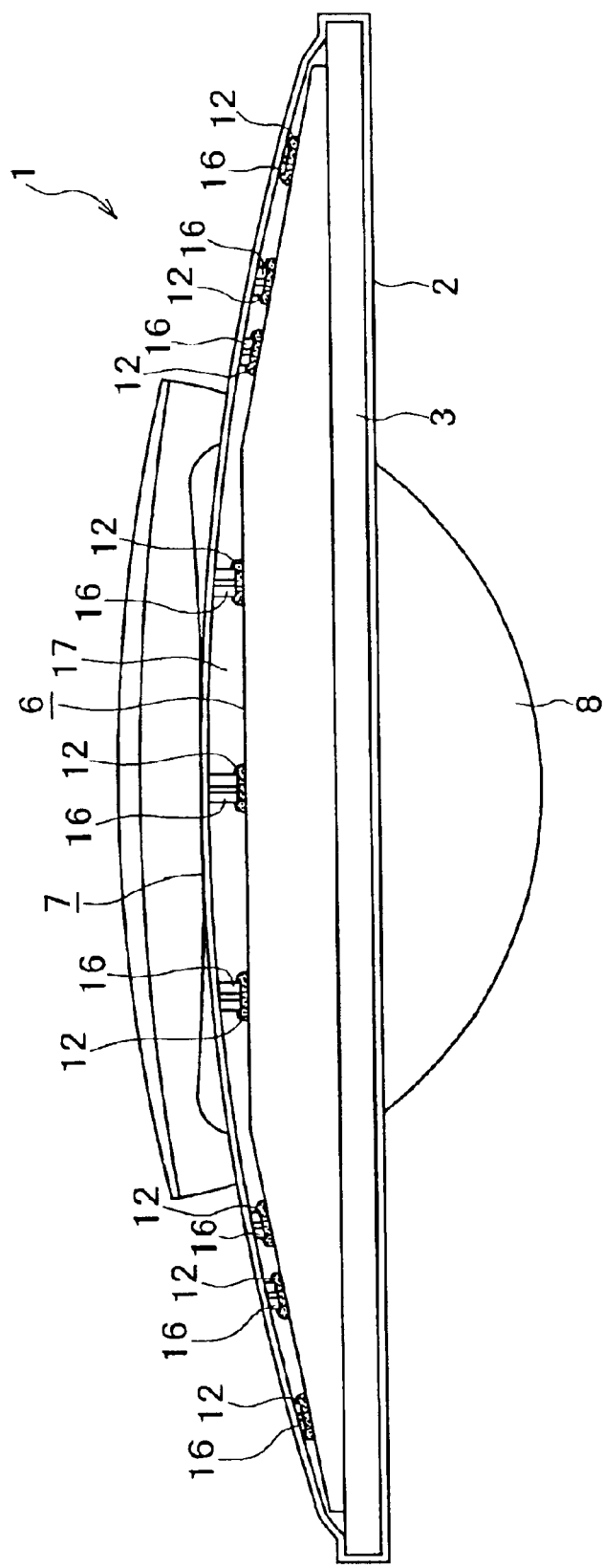
FIG. 5 is a horizontal sectional view of the display apparatus according to the first embodiment.

The back cover 7 is formed such that it is swollen rearwardly toward the center thereof similarly to the partition wall plate 6 (refer to FIG. 5). Further, a plurality of cross-shaped ribs 16 are formed integrally at positions of the inner face of the back cover 7 corresponding to the cushioning members 12 adhered to the partition wall plate 6 (refer to FIG. 7).

The cross-shaped ribs 16 are designed so that, when the back cover 7 is attached, a small gap, for example, a gap of 1 mm, may be formed between each of the tip portions of the cross-shaped ribs 16 and the partition wall plate 6, assuming that the cushioning members 12 are not involved. Thus, when the back cover 7 is attached, the cushioning members 12 are resiliently yielded by the cross-shaped ribs 16 (refer to FIGS. 4 and 5).

It is to be noted that, although it is otherwise possible to eliminate the cushioning members 12 from the partition wall plate 6 such that the tip portions of the cross-shaped ribs 16 contact directly with the partition wall plate 6, where the cushioning members 12 are interposed between the partition wall plate 6 and the back cover 7 as described above, the partition wall plate 6 and the back cover 7 can contact with certainty even if the accuracy in dimension and the accuracy in mounting of the back cover 7 and the partition wall plate 6 are comparatively rough.

The back cover 7 is screwed at the upper side 7a and the opposite left and right sides 7a thereof to the respective upper side and opposite left and right sides of the front panel 2 and also to the support chassis 4. Upon such screwing, the partition wall plate 6 is fastened together.

A predetermined space 17 is formed between the partition wall plate 6 and the back cover 7 (refer to FIGS. 4 and 5), and the two speaker units 5 are positioned in the space 17 (refer to FIG. 4).

Since the space 17 is formed in a communicating state with the back side of the speaker units 5, it functions as a space of a speaker cabinet, and consequently, the sound quality thereof is improved. It is to be noted that, since the space 17 is defined by the partition wall plate 6, the back cover 7 and part of the front panel 2, the partition wall plate 6, the back cover 7 and part of the front panel 2 form an enclosure of the speaker system and, if a port (not shown) is formed at part of the front panel 2, then a speaker system of the Bass Reflex type can be constructed.

Further, when the back cover 7 is assembled, the cross-shaped ribs 16 contact with the partition wall plate 6 with the cushioning members 12 resiliently yielded as described hereinabove, and therefore, the back cover 7 and the partition wall plate 6 resiliently contact with each other at a plurality of locations (refer to FIGS. 4 and 5). Consequently, small vibrations of the partition wall plate 6 and the back cover 7 can be prevented.

In particular, since each of the partition wall plate 6 and the back cover 7 is formed from a plate member of a comparatively great area, when the speaker units 5 are driven, vibrations or scattering may possibly occur with the partition wall plate 6 and the back cover 7 depending upon the sound volume. However, since the partition wall plate 6 and the back cover 7 contact with each other at the predetermined positions as described above, generation of such small vibrations can be prevented.

Particularly, the contact at points between the screwed portions 13 of the partition wall plate 6 and the back cover 7 acts effectively for suppression of vibrations, and therefore, small vibrations can be further suppressed.

Further, since the cross-shaped ribs 16 are formed integrally with the back cover 7 in order to achieve such contact between the partition wall plate 6 and the back cover 7 as described above, there is no necessity to form members for allowing them to contact with each other, but the cross-shaped ribs 16 can be formed integrally with the back cover 7 upon molding of the back cover 7 and therefore can be formed at a reduced cost.

Further, since the contact between the partition wall plate 6 and the back cover 7 is provided at "points", the space 17 can be formed with a sufficient size, which contributes to improvement of the sound quality. It is to be noted that, while, in the display apparatus of the present embodiment, the contact between the partition wall plate 6 and the back cover 7 is performed at a plurality of points, the present invention is not limited to the specific arrangement, and linear contact portions may be provided instead.

Further, it is to be noted that, although the cross-shaped ribs 16 need not be employed for the contact between the partition wall plate 6 and the back cover 7 but boss-like elements may be used instead, where boss-like elements are employed, sink marks by molding appear conspicuously on the back face (outer surface) of the back cover 7, and therefore, it is preferable to use the "cross-shaped ribs 16".

Further, while members (cross-shaped ribs 16) for contacting with the partition wall plate 6 are formed on the back cover 7 in this manner, such members need not necessarily be provided in this manner, but members (not shown) different from "cross-shaped ribs" such as, for examples, projections, may be provided on the partition wall plate 6. More particularly, boss-like studs may be fastened to the back face of the partition wall plate 6 from the inner face of the partition wall plate 6 by means of screws such that end portions (rear end portions) of the studs contact with the inner face of the back cover 7. Where such studs are used in this manner, "sink marks" by molding are not formed on the outer surface of the back cover 7, and a good appearance of the back cover 7 can be anticipated.

It is effective to adhere a cushioning material (not shown) to the partition wall plate 6 and the back cover 7 in order to suppress small vibrations of the partition wall plate 6 and the back cover 7 or to form ribs (not shown) integrally with the partition wall plate 6 and the back cover 7 upon presswork or molding in order to provide rigidity to the partition wall plate 6 and the back cover 7. However, if only such adhesion of a cushioning material or formation of ribs is employed, then where the partition wall plate 6 and the back cover 7 have great areas, it is difficult to prevent vibrations with certainty and besides increase of the man-hours for assembly and the cost is estimated. Therefore, in order to prevent small vibrations with certainty and at a low cost, it is preferable to establish the contact between the partition wall plate 6 and the back cover 7 in such a manner as described above.

Figure 8:
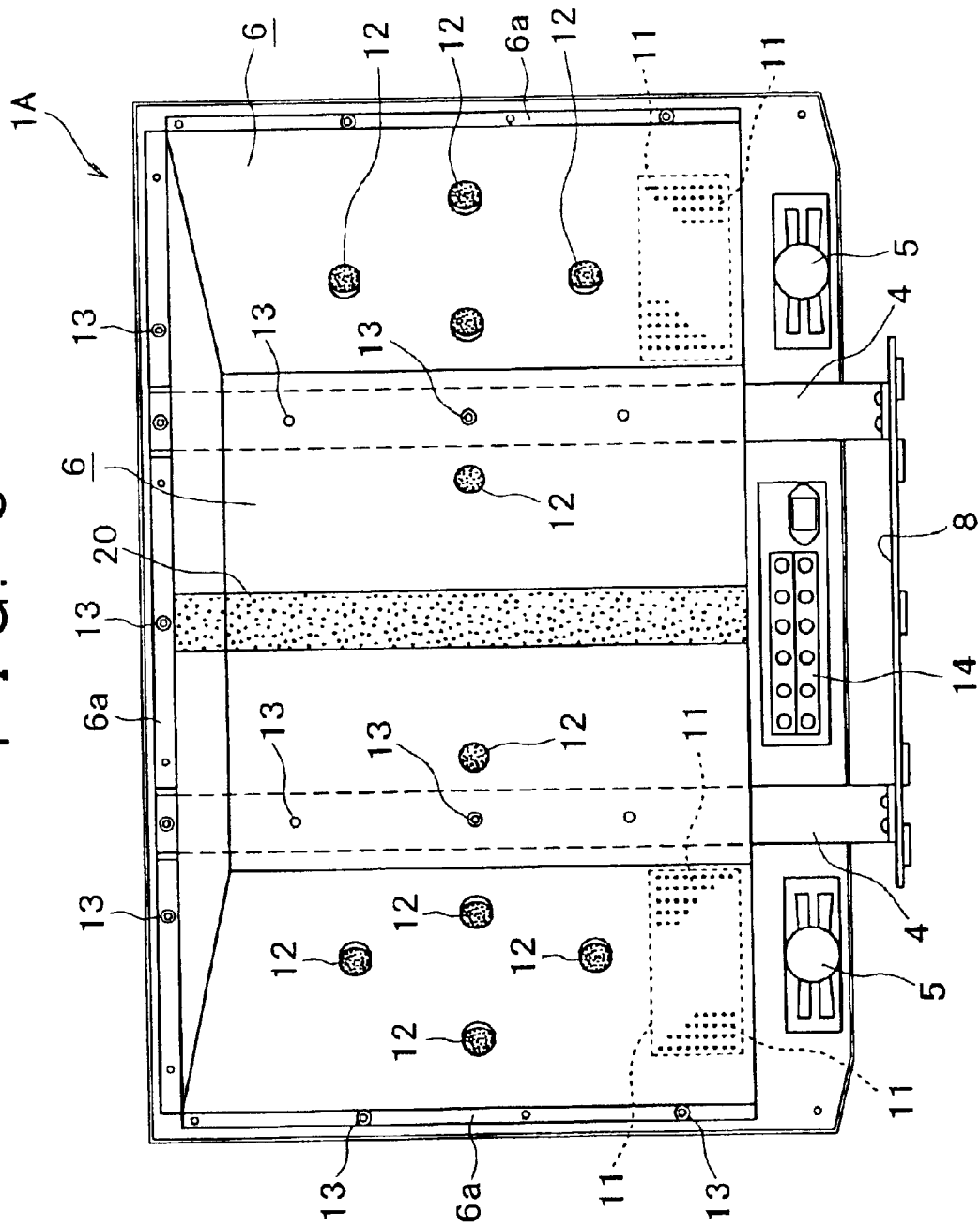
FIG. 8 is a rear elevational view of a display apparatus according to a second embodiment of the present invention with a back cover removed.
Figure 9:
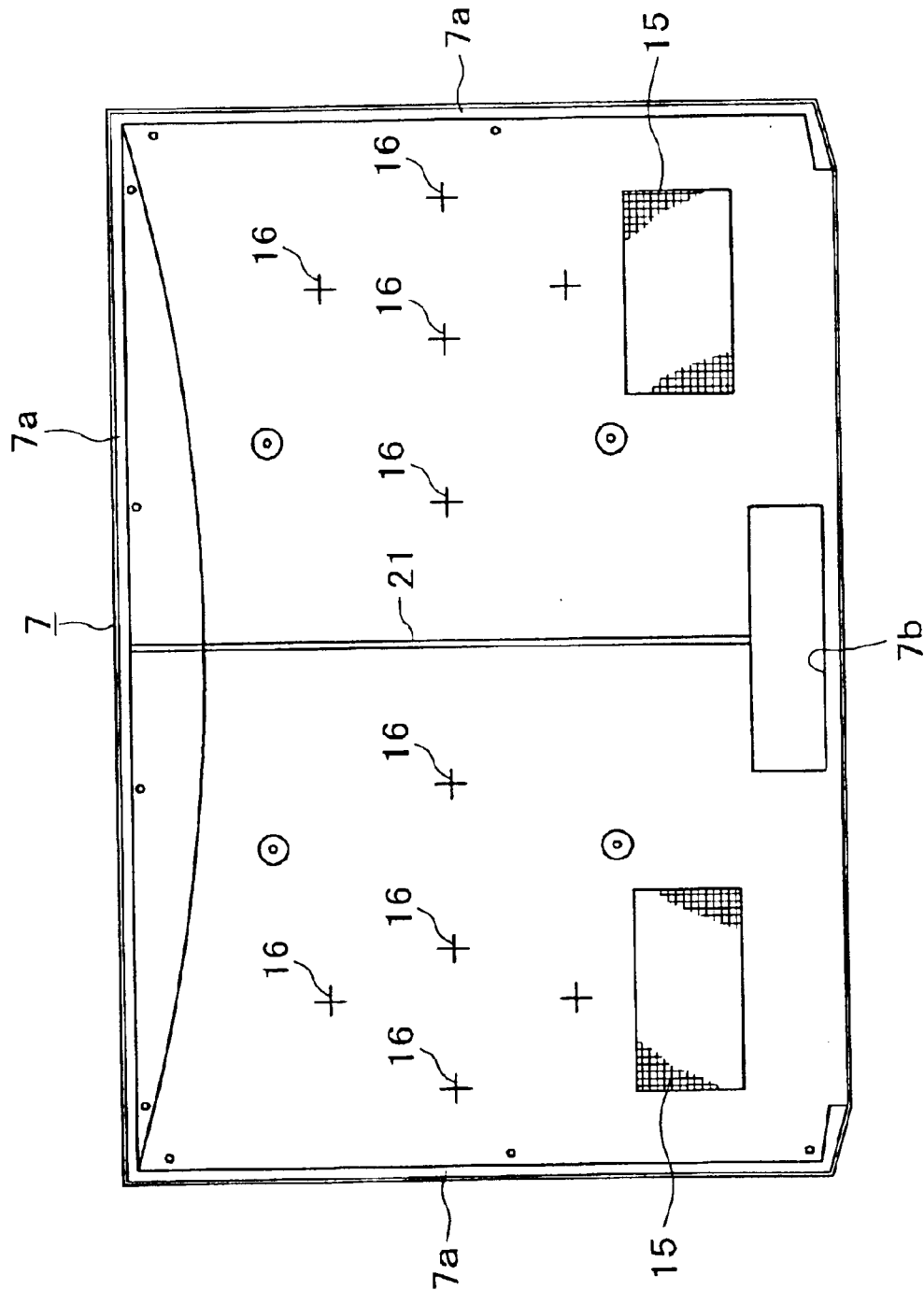
FIG. 9 is a front elevational view of the back cover of the display apparatus according to the second embodiment.
Figure 10:
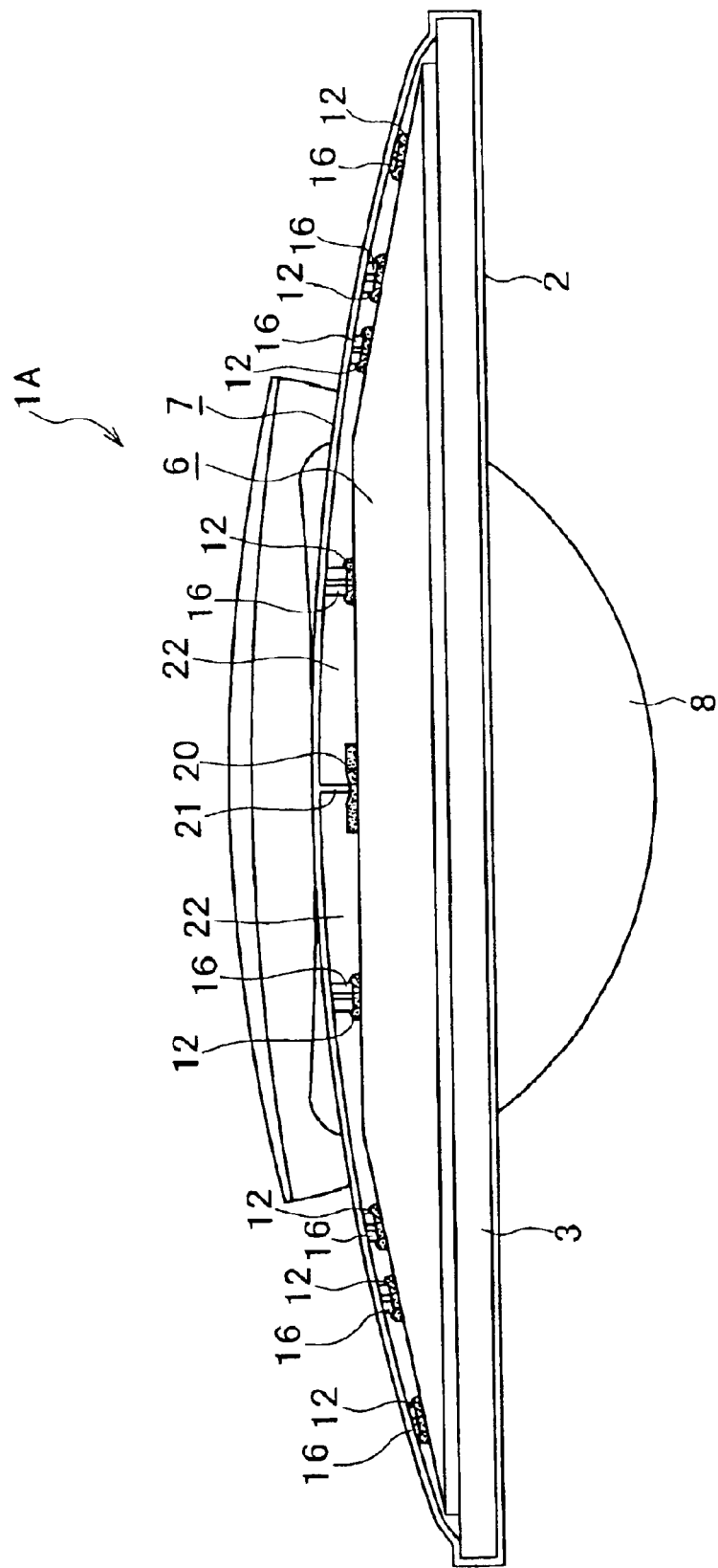
FIG. 10 is a horizontal sectional view of the display apparatus according to the second embodiment.

FIGS. 8 to 10 show a display apparatus, according to a second embodiment of the present invention, which is applied to a television receiver.

The television receiver according to the present embodiment is a modification to and includes common components to those of the television receiver according to the first embodiment described hereinabove, but is different principally in that the space 17 defined by the partition wall plate 6 and the back cover 7 is divided into left and right spaces. Thus, the television receiver 1A according to the second embodiment is described below principally in the difference.

A cushioning member 20 in the belt-like form is adhered to a substantially middle portion of a partition wall plate 6 of the television receiver 1A in the leftward and rightward direction such that the cushioning member 20 extends in the upward and downward direction. The cushioning member 20 has a thickness substantially equal to that of a centrally positioned one of the cushioning members 12 having a flattened cylindrical shape described hereinabove in connection with the first embodiment.

A rib 21 is formed integrally at a location of the inner face of the back cover 7 corresponding to the belt-like cushioning member 20 of the partition wall plate 6 and extends in the upward and downward direction (refer to FIG. 9). The rib 21 is designed so that, when the back cover 7 is attached, a small gap, for example, a gap of 1 mm, may be formed between the tip portion of the rib 21 and the partition wall plate 6, assuming that the cushioning member 20 is not involved. Thus, when the back cover 7 is attached, the cushioning member 20 is resiliently yielded by the rib 21 (refer to FIG. 10). It is to be noted that the cushioning member 20 and the rib 21 function as a partition member.

When the back cover 7 is attached to the back side of the partition wall plate 6, the rib 21 of the back cover 7 yieldably compresses the belt-like cushioning member 20 thereby to form two leftwardly and rightwardly divided spaces 22 between the back cover 7 and the partition wall plate 6 (refer to FIG. 10). As the cushioning member 20 is yieldably compressed, the partition wall plate 6 and the back cover 7 contact with each other at the location of the cushioning member 20, and consequently, generation of small vibrations at the partition wall plate 6 and the back cover 7 when the speaker units 5 are driven can be further suppressed.

Accordingly, the speaker units 5 are individually located in the two spaces 22 formed between the back cover 7 and the partition wall plate 6, and therefore, stereo speaker systems leftwardly and rightwardly independent of each other are formed and further improvement of the sound quality can be achieved.

It is to be noted that, while, in the embodiments described above, the display apparatus of the present invention is applied to a plasma display panel, the present invention is not limited to this but can naturally be applied to any display apparatus which has a comparatively small depthwise dimension for the size of the display screen, that is, which has a comparatively small thickness, such as an electroluminescent display (ELD) unit or a liquid crystal display (LCD) unit.

Further, while the embodiments described above use an aluminum plate for providing a function of shielding electromagnetic waves as the partition wall plate, the present invention is not limited to this, but the back cover may have an electromagnetic wave shielding function, without providing the electromagnetic wave shielding function for the partition wall plate. For example, the partition wall plate is used to form the space described above, and a shielding member in the form of sheet is applied to or a shielding film by painting or vapor deposition is formed on the inner face of the back cover. Alternatively, the partition wall plate may be formed from an aluminum plate as described above while a shielding member is applied to or a shielding material is painted or vapor deposited on the inner face of the back cover.

While preferred embodiments of the present invention have been described using specific terms, such description is for illustrative purposes only, and it is to be understood that changes and variations may be made without departing from the spirit or scope of the following claims.

What is claimed is:

1. A display apparatus comprising:

a display panel having a display face;

a front panel forming a frame having an opening through which said display face of said display panel is exposed;

at least one speaker unit attached to a back side of said front panel so as to produce sounds at a front side of said front panel;

a partition wall plate for covering the back of said display panel such that said at least one speaker unit is not covered by said partition wall plate; and a back cover attached to a rear periphery of said front panel for covering said at least one speaker unit and said partition wall plate and being spaced apart from said partition wall plate so as to form a speaker enclosure volume, wherein said at least one speaker unit is in communication with said speaker enclosure volume.

2. The display apparatus according to claim 1, wherein said partition wall plate is formed from an electromagnetic shielding material.

3. The display apparatus according to claim 1, wherein left and right speaker units are provided, and further comprising a partition member for dividing said speaker enclosure volume formed between said partition wall plate and said back cover when said back cover is attached to the rear periphery of said front panel into left and right enclosure volumes, and wherein said left and right speaker units are respectively in communication with said left and right enclosure volumes.

4. The display apparatus according to claim 1, wherein said back cover and said partition wall plate are in mutual contact at a plurality of locations including outer peripheral edge portions thereof.

5. The display apparatus according to claim 4, further comprising a plurality of cross-shaped ribs having a cross-shape as viewed from a front formed on an inner face of said back cover and contacting at ends thereof with said partition wall plate.

6. The display apparatus according to claim 5, further comprising a cushioning material interposed between said cross-shaped ribs and said partition wall plate.

* * * * *